(12) United States Patent
Lehotsky et al.

(10) Patent No.: US 7,940,744 B2
(45) Date of Patent: May 10, 2011

(54) SYSTEM, APPARATUS AND METHOD FOR AUTOMATED WIRELESS DEVICE CONFIGURATION

(75) Inventors: Daniel Adolf Lehotsky, Waterloo (CA); Michael Mannion, Toronto (CA); Tsutomu Nobutani, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1104 days.

(21) Appl. No.: 11/681,078

(22) Filed: Mar. 1, 2007

(65) Prior Publication Data
US 2007/0146782 A1 Jun. 28, 2007

Related U.S. Application Data

(63) Continuation-in-part of application No. 11/100,150, filed on Apr. 6, 2005, now abandoned.

(60) Provisional application No. 60/610,646, filed on Sep. 16, 2004.

(51) Int. Cl.
*H04L 12/28* (2006.01)
(52) U.S. Cl. ........ 370/351; 370/315; 370/328; 370/338; 370/428; 455/552.1; 455/450; 358/1.15; 709/217; 709/221; 710/8
(58) Field of Classification Search .................. 370/351, 370/310.2, 315, 328, 338, 413, 428; 455/552.1, 455/450, 456.1; 358/1.15; 709/217, 221; 710/8
See application file for complete search history.

(56) References Cited

U.S. PATENT DOCUMENTS

| | | | |
|---|---|---|---|
| 6,098,098 A | 8/2000 | Sandahl et al. | |
| 2002/0159090 A1* | 10/2002 | Nobutani et al. | ............ 358/1.15 |
| 2003/0100335 A1* | 5/2003 | Gassho et al. | ................. 455/552 |
| 2005/0108369 A1 | 5/2005 | Sather et al. | |
| 2005/0270989 A1 | 12/2005 | Park et al. | |
| 2006/0047784 A1 | 3/2006 | Li et al. | |
| 2006/0056315 A1 | 3/2006 | Oman et al. | |
| 2006/0064730 A1 | 3/2006 | Rael et al. | |
| 2006/0067295 A1 | 3/2006 | Lehotsky et al. | |
| 2006/0068820 A1 | 3/2006 | Sugaya et al. | |
| 2007/0146782 A1 | 6/2007 | Lehotsky et al. | |

FOREIGN PATENT DOCUMENTS

| | | |
|---|---|---|
| EP | 1315334 A1 | 5/2003 |
| EP | 1538792 A2 | 6/2005 |
| EP | 1638258 A1 | 3/2006 |
| GB | 2411801 | 9/2005 |
| JP | 2006-513623 | 4/2006 |
| JP | 2006-262536 | 9/2006 |
| WO | 2004064328 A2 | 7/2004 |

\* cited by examiner

*Primary Examiner* — Mathew D. Anderson
*Assistant Examiner* — Shaima Q Aminzay
(74) *Attorney, Agent, or Firm* — Mark P. Watson

(57) ABSTRACT

A method and system for automatically configuring a plurality of wireless peripheral devices within a network environment. The method includes identifying a plurality of wireless peripheral devices, including one existing networked wireless device. The existing networked wireless device is configured to function as a master device. The master device identifies one of the remaining wireless peripheral devices that has yet to be configured. The master device replicates itself by wirelessly transmitting the configuration data to the identified wireless peripheral device. The configuration data enables the identified peripheral wireless device to assume network operation and to assume functionality of the master device so as to be capable of automatically causing the configuration of additional peripheral devices.

14 Claims, 9 Drawing Sheets

SYSTEM, APPARATUS AND METHOD FOR AUTOMATED WIRELESS DEVICE CONFIGURATION

CROSS-REFERENCE TO RELATED APPLICATIONS

This application is a Continuation-In-Part of U.S. application Ser. No. 11/100,150, filed Apr. 6, 2005, entitled METHOD AND SYSTEM FOR AUTOMATICALLY CONFIGURING A WIRELESS PERIPHERAL DEVICE IN A NETWORK ENVIRONMENT, which claims the benefit of U. S. Provisional Application No. 60/610,646 filed Sep. 16, 2004, which applications are incorporated herein by reference in their entirety.

BACKGROUND

1. The Field of the Invention

The present invention relates generally to peripheral devices, such as printers. More specifically, the present invention relates to methods and systems for automatically configuring a wireless peripheral device in a network environment.

2. The Relevant Technology

Wireless devices, such as laptops, personal computers, personal digital assistants (PDAs), cellular telephones, printers, and the like are being deployed in a widening variety of environments and are being provided with increased functionality in response to consumer needs. The configuration of such wireless devices to customize them for the requirements of particular environments is well understood. Wireless devices typically have a number of user-configurable settings that permit configuration of their functionality. Such user-configurable functionality can include security settings, language settings, user settings, among other details unique to each device and user.

The user-configurable settings also include network settings that can be modified to enable the wireless devices to communicate with other devices over a network in a desired manner. For example, where a wireless device includes a network interface and is capable of communication over an Internet Protocol ("IP") network, the network settings can include the IP address assigned to the wireless device, the subnet mask of the network to which the wireless device is connected and the IP address of a gateway for accessing other IP addresses outside the subnet mask. Where the network interface is capable of connecting to a wireless local area network using IEEE 802.11x technology or the like, the network settings can include the service set identifier ("SSID") of the wireless device, the name of a preferred wireless network access point for the wireless device and various security settings (such as, for example, wired equivalent privacy ("WEP") or WiFi Protected Access ("WPA")). Further, there can be other printer settings such as simple network management protocol ("SNMP"), trap settings for automatic notification of printer error states and line printer requester ("LPR") settings for setting print queue information.

Adding a wireless peripheral device, such as a printer, to a wireless local area network typically requires intimate knowledge of the wireless local area network topology and peripheral device settings in order for the network to access the wireless printer. Typically, settings of the network host, the new wireless network access point for the wireless device, and the wireless peripheral device are manually updated to add the wireless device to the wireless local area network. As will be appreciated, manually updating the settings of the network host, the wireless network access point, and the wireless peripheral device is a time consuming and difficult task requiring significant technical skill.

The process of adding wireless devices to a network environment becomes increasingly tedious as the number of wireless devices increases. Often, a network administrator is required to individually configure each of the wireless devices being added to the network environment. Hence, a need exists to improve the process of configuring a large number of wireless peripheral devices, such as printers and the like, to operate in a network environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of automatically configuring a peripheral device to allow it to operably connect to a given communications network. Moreover, preferred embodiments allow for the automatic configuration of a number of peripheral devices that are to be added to a network.

The method may be practiced, for example, in a network environment that includes at least one existing "master" device. The master device is functionally configured for operation within the network and is also wirelessly connected to one or more additional "peripheral" devices. Each of these "peripheral devices" must be properly configured so as to be capable of communicating within the network environment. Configuration of these peripheral devices automatically occurs at the direction of the master device. In this example, the master device is provided with a network configuration dataset or database that includes, for example, network parameter settings information and data that can be used to configure one or more of the peripheral devices and thereby enable their respective communication and functionality via the network. In one embodiment, the master device receives the configuration dataset from a host device, or from another master device in the network.

In an illustrated embodiment, once the "master" device receives the configuration dataset, it identifies at least one of the peripheral devices that requires network "configuration." In one embodiment, the identity and number of peripheral devices needing configuration can be provided to the master device by way of master "settings" information and data. Once a peripheral device is identified, the master device wirelessly transmits the configuration database (in whole or in part) to the "target" peripheral device. The appropriate configuration data is then automatically applied to the target peripheral device, thereby enabling the target peripheral device to assume network operation. Moreover, the initial master device "replicates" itself by requesting that the newly configured target peripheral assume "master" device duties. This newly created master then identifies at least one remaining peripheral device (if any) that still requires configuration, which again can be provided by way of master settings information forwarded by the previous master device. The configuration database is then transferred from the new master to the next peripheral device, which is automatically configured for network functionality. If further configuration is needed, this newly configured device can also assume "master" device duties so as to initiate configuration of additional peripheral devices.

Each newly configured peripheral device assumes the functionality of a "master" device, and in turn identifies a remaining peripheral device that has yet to be configured. It then wirelessly conveys the configuration data to it in the same manner. This replication of master duties can continue from one peripheral device to the next, until all peripheral devices are configured for operation within the network. The process of replicating master devices greatly decreases the network configuration time, especially when a large number of new devices need to be configured.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION

In the following detailed description of the preferred embodiments, reference is made to the accompanying drawings which form a part hereof, and in which are shown by way of illustration specific embodiments of the present invention. It is to be understood that other embodiments may be utilized and structural changes may be made without departing from the scope of the present invention.

Embodiments of the present invention relate to a system and method for automatically configuring a peripheral device, such as a printer, to operate within a network environment. In one exemplary method, an existing peripheral device is conditioned to wirelessly transmit configuration data to a new peripheral device that will be added to the network environment. Upon receiving the configuration data, the new peripheral device automatically applies the configuration data, which thereby enables the new device to assume network operation.

Figure 1:
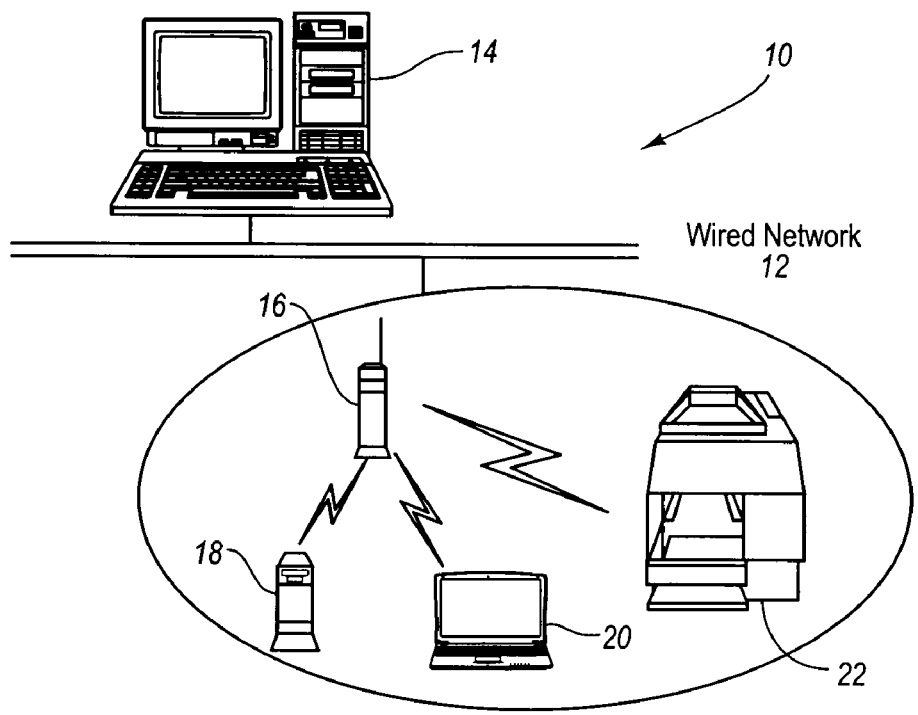
FIG. 1 is a schematic diagram of an example network environment including a wireless network access point and a plurality of wireless peripheral devices communicating with a wired network via the wireless network access point.
Figure 2:
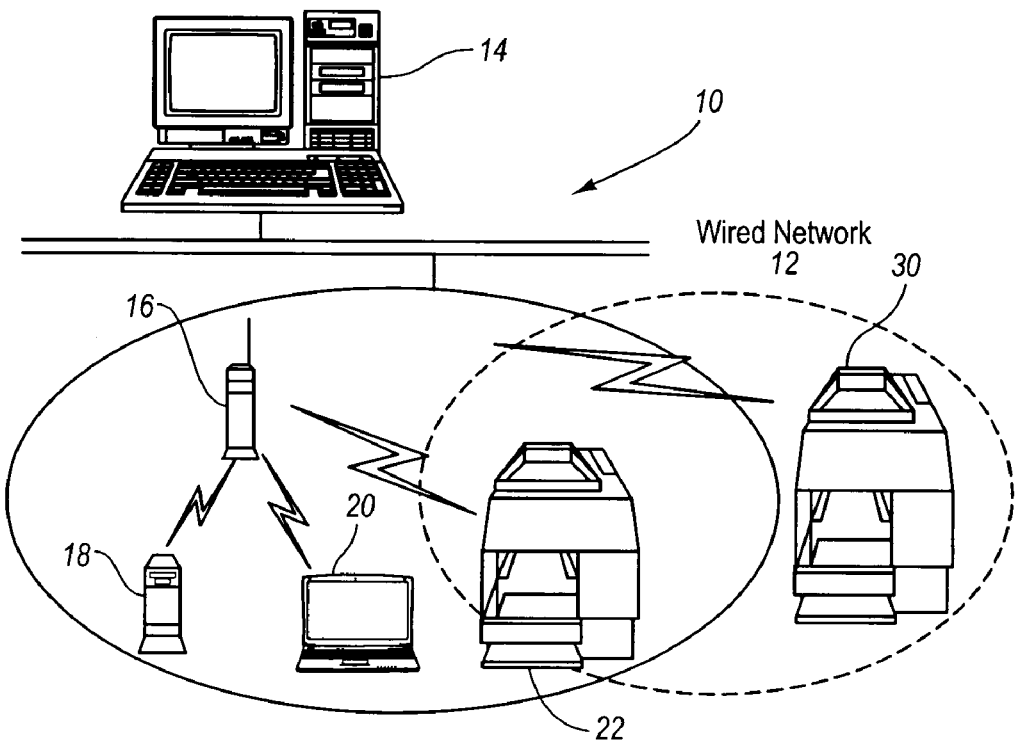
FIG. 2 is a schematic diagram of the network environment of FIG. 1 showing the addition of a new wireless printer.

Turning now to FIG. 1, one example of a network environment is illustrated and is generally identified by reference numeral 10. In this example, the network environment 10 includes a wired network 12 including a personal computer 14 and a wireless network access point 16. A plurality of wireless peripheral devices is shown communicating with the wired network 12 via the wireless network access point 16. In this example illustration, the wireless peripheral devices include a personal digital assistant ("PDA") 18, a laptop computer 20 and a wireless printer 22. The wireless printer 22 in this embodiment may communicate with the wireless network access point 16 using IEEE 802.11x technology, although other wireless protocols and communication schemes could be used. Although the wired network 12 is shown as including a single personal computer 14 and a single wireless network access point 16, and although the wireless network access point 16 is shown as communicating with three (3) wireless peripheral devices 18, 20 and 22, those of skill in the art will appreciate that this is for ease of illustration only. The network environment 10 may include virtually any number of personal computers, wireless network access points, servers and peripheral devices.

Adding wireless peripheral devices 18, 20 and 22 to the network environment 10 can be time consuming and complicated requiring significant technical skill. To facilitate adding wireless peripheral devices 18, 20 and 22 to the network environment 10, the wireless peripheral devices are provided with automated wireless peripheral device configuration tools, which can be implemented, for example, by way of firmware (or any other appropriate executable instruction scheme) stored in the peripheral device, and that can be executed by one or more processors in the peripheral device. Execution of the software allows an existing networked peripheral device to automatically configure new peripheral devices that are to be added to the network environment 10. Thus, in one example, an existing printer can configure a new printer so as to enable it to operate within the network. This configuration occurs automatically, and thus does not require the intervention and manipulation by a network administrator, thereby saving time and expense.

In a first example embodiment, the automated wireless peripheral device configuration firmware is executed by the wireless peripheral device in response to user input. In this embodiment, the user input is used to set the wireless peripheral device either to a "source mode" or a "target mode." In this embodiment, when an existing networked wireless printer is to be used to automatically configure a new wireless printer, the existing wireless printer is set to a source mode, and the new wireless printer (the peripheral device requiring configuration) is set to a target mode. Further specifics of this particular embodiment for automated wireless peripheral device configuration will now be described with reference to FIGS. 2 to 6b. Although the following description portrays the addition of a wireless printer to a network environment, the principles described below may be applied to the addition of any wireless peripheral device to the network environment.

Using the methodology described in FIGS. 2 to 6b, when a new wireless printer 30 is to be added to the network environment 10, an existing wireless printer 22 is conditioned to the source mode and the new wireless printer 30 (the device to be added to the network) is conditioned to the target mode. In one embodiment, setting the existing wireless printer 22 to the source mode might involve opening the cover of the wireless printer 22, pressing a paper feed button (or any other appropriate user interface on the peripheral) a predetermined number of times or in predetermined sequence, and then closing the cover of the wireless printer 22. Performing these, or similar, simple steps using a user interface of the wireless printer 22 causes the wireless printer to execute the automated wireless peripheral device configuration firmware, causing the existing wireless printer 22 to enter the source mode. A similar approach might be used to condition a peripheral to function as a target mode.

Figure 3:
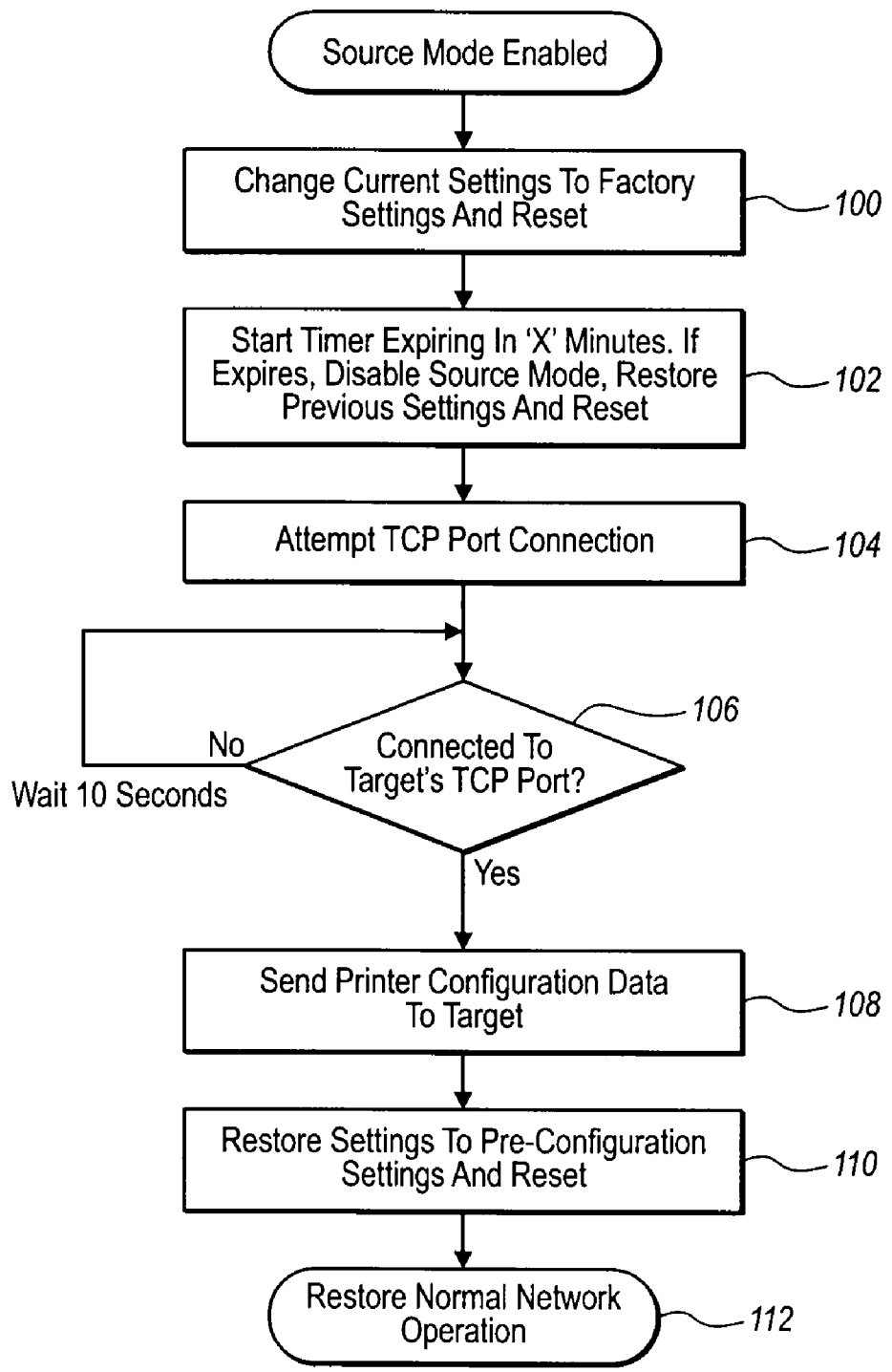
FIG. 3 is a flowchart showing one example of the steps performed by an existing networked wireless printer when conditioned to a source mode during automated wireless peripheral device configuration.

FIG. 3 illustrates one example embodiment of a method of providing automated wireless peripheral device configuration in a network environment, from the perspective of an existing wireless printer 22. When the existing networked wireless printer 22 executes the automated wireless peripheral device configuration firmware (or similar programmable implementation) and enters the source mode, the wireless printer 22 automatically changes 100 its current settings to its preprogrammed factory settings and resets itself so that the factory settings take effect. At step 102, a timer is initiated to establish the time period by which the automated wireless peripheral device configuration is to be completed. With the timer initiated, the wireless printer 22 attempts to connect to the transmission control protocol ("TCP") port (or similar communications protocol interface) of the new wireless printer 30 over a wireless communications link, at 104. At step 106, the method assesses whether the attempt to connect to the TCP port of the new wireless printer 30 was successful. If not, the wireless printer 22 waits a predetermined amount of time, such as ten (10) seconds, before returning to step 106 to reassess whether the TCP port of the new wireless printer 30 has connected to the wireless communications link.

If, at program step 106 the TCP port of the new wireless printer 30 has connected to the wireless communications link, the existing wireless printer 22 sends printer configuration data, as denoted at step 108, to the new wireless printer 30. The printer configuration data that is transmitted to the new wireless printer 30 may include, for example, the printer SSID, the network mode, the network transmission rate, the RTS threshold, power management instructions, the access point density, authentication settings, encryption and the encryption key, and the like. After the printer configuration data has been successfully transmitted to the new wireless printer 30, at program step 110 the wireless printer 22 automatically restores its settings and resets itself so that its previous settings take effect. At step 112, the wireless printer 22 is able to resume its normal network operation.

If the timer expires prior to completion of automated wireless peripheral device configuration, the wireless printer 22 is automatically conditioned to restore its settings and reset so that the wireless printer resumes its normal network operation. Completing automated wireless peripheral device configuration in this case requires the wireless printer 22 to be reconditioned to the source mode, for example by using the user interface of the wireless printer in the manner described previously.

Figure 4:
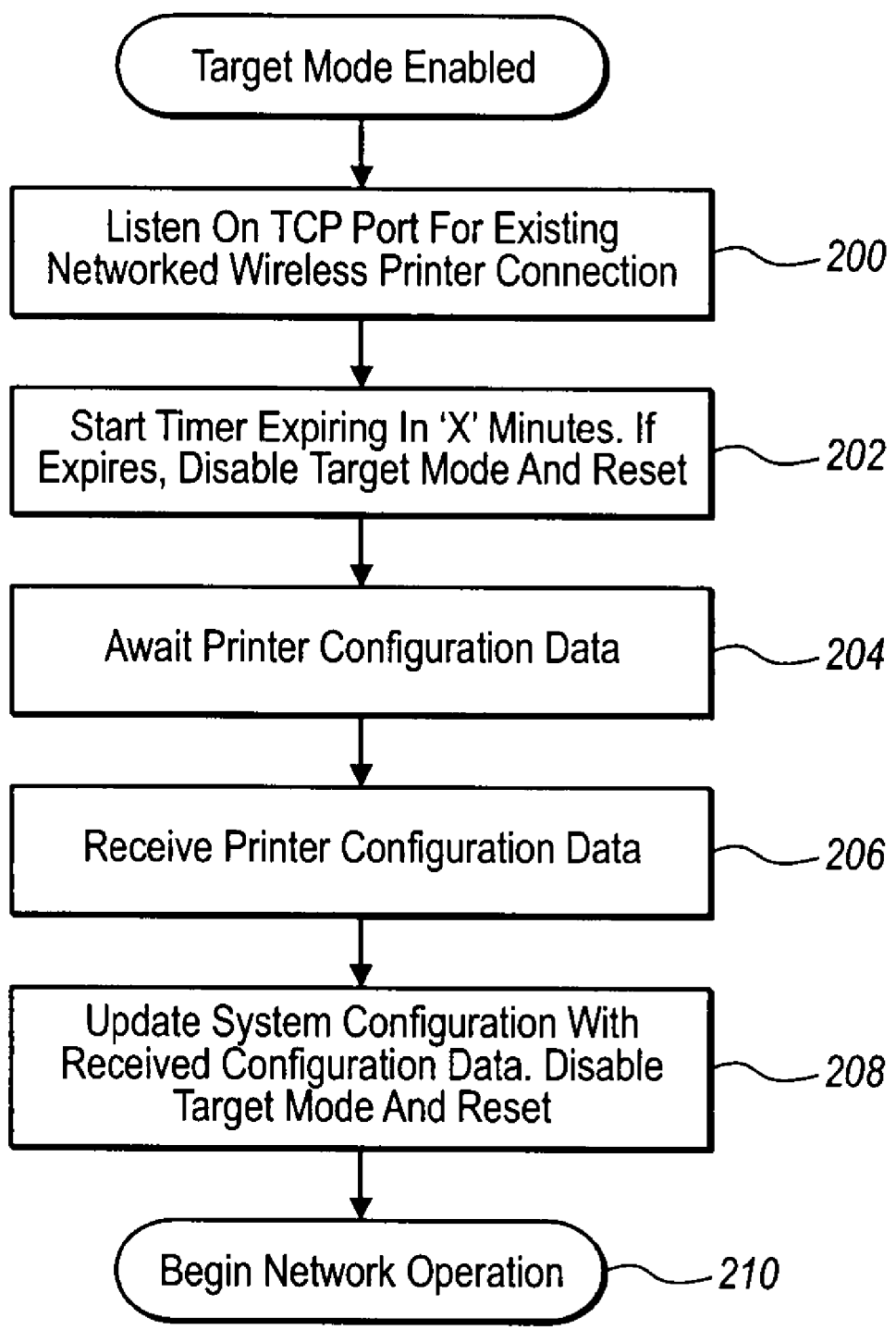
FIG. 4 is a flowchart showing one example of the steps performed by a new wireless printer when conditioned to a target mode during automated wireless peripheral device configuration.

FIG. 4 illustrates another example embodiment of a method of automated wireless peripheral device configuration in a network environment, illustrated here from the perspective of the new wireless printer 30. When the new wireless printer 30 executes the automated wireless peripheral device configuration firmware and enters the target mode, the wireless printer 30, at program step 200, monitors its TCP port (or similar interface) for an existing networked wireless printer connection. When a connection to the existing networked wireless printer 22 is made, a timer is initiated, as is indicated at step 202, to establish the time period by which the wireless printer 30 must be configured. At step 204, the wireless printer 30 awaits receipt of printer configuration data from the wireless printer 22. At program step 206, the printer configuration data is received from the wireless printer 22. The wireless printer 30, at 208, automatically updates its settings using the received printer configuration data and automatically exits the target mode and resets itself so that the updated settings of the wireless printer take effect. At program step 210, the new wireless printer 30 is able to assume network operation.

At program step 202, if the timer expires prior to configuration of the new wireless printer 30, the wireless printer 30 exits the target mode and resets. Completing automated wireless peripheral device configuration in this case requires the wireless printer 30 to be reconditioned to the target mode using the user interface of the wireless printer in the manner described previously.

Figure 5:
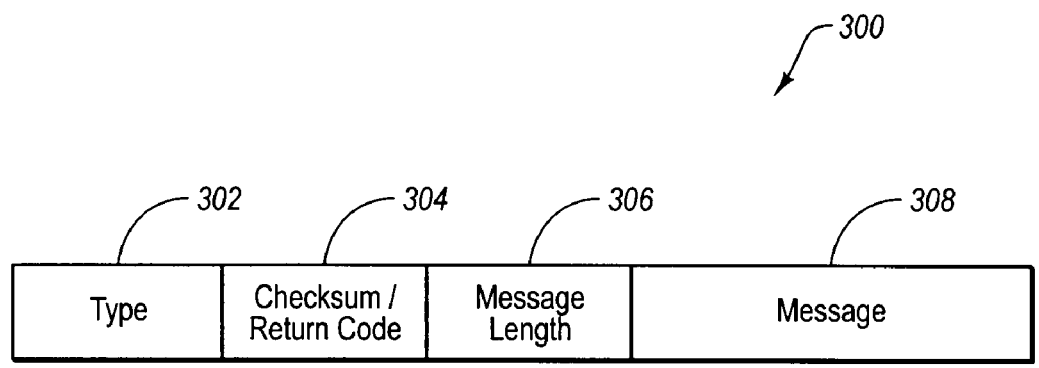
FIG. 5 is an example of the packet structure used by the existing and new wireless printers when communicating during automated wireless peripheral device configuration.

In the illustrated example, communication between the wireless printers 22 and 30 can be provided by way of a bidirectional data packet communications scheme. FIG. 5 shows one embodiment of the data packet structure that may be used by the wireless printers 22 and 30. As can be seen, in this example each data packet 300 includes message type byte(s) 302, checksum/return code byte(s) 304, message length byte(s) 306 and message byte(s) 308. The message type byte 302 identifies the type of data packet and, in the illustrated example, can take one of two forms, namely data type (0x00) or reply type (0xFF). The checksum/return code bytes 304 may include a checksum for data types and a return code for reply types. The message length byte 306 identifies the length of the message in the message bytes 308.

Figure 6B:
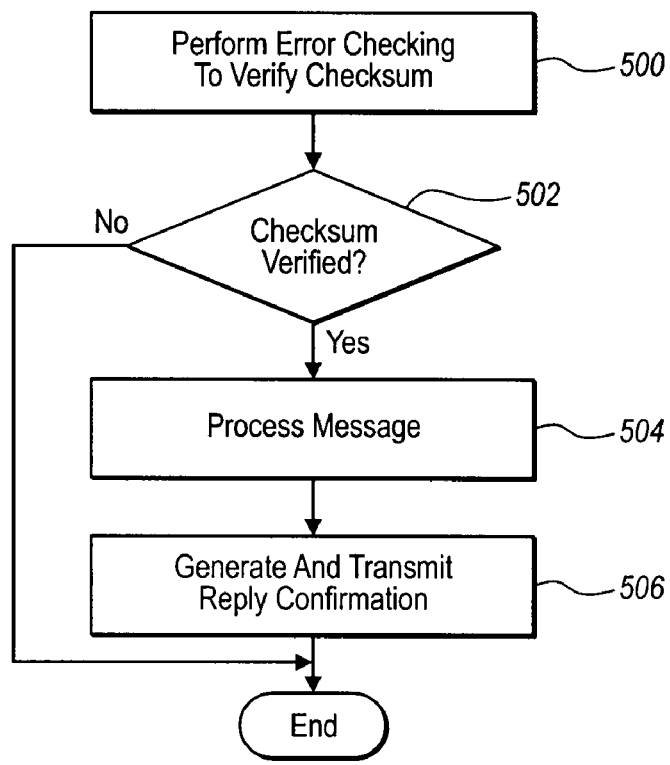
FIGS. 6a and 6b are flowcharts showing one example of the steps performed during communications between the existing and new wireless printers during automated wireless peripheral device configuration.
Figure 6A:
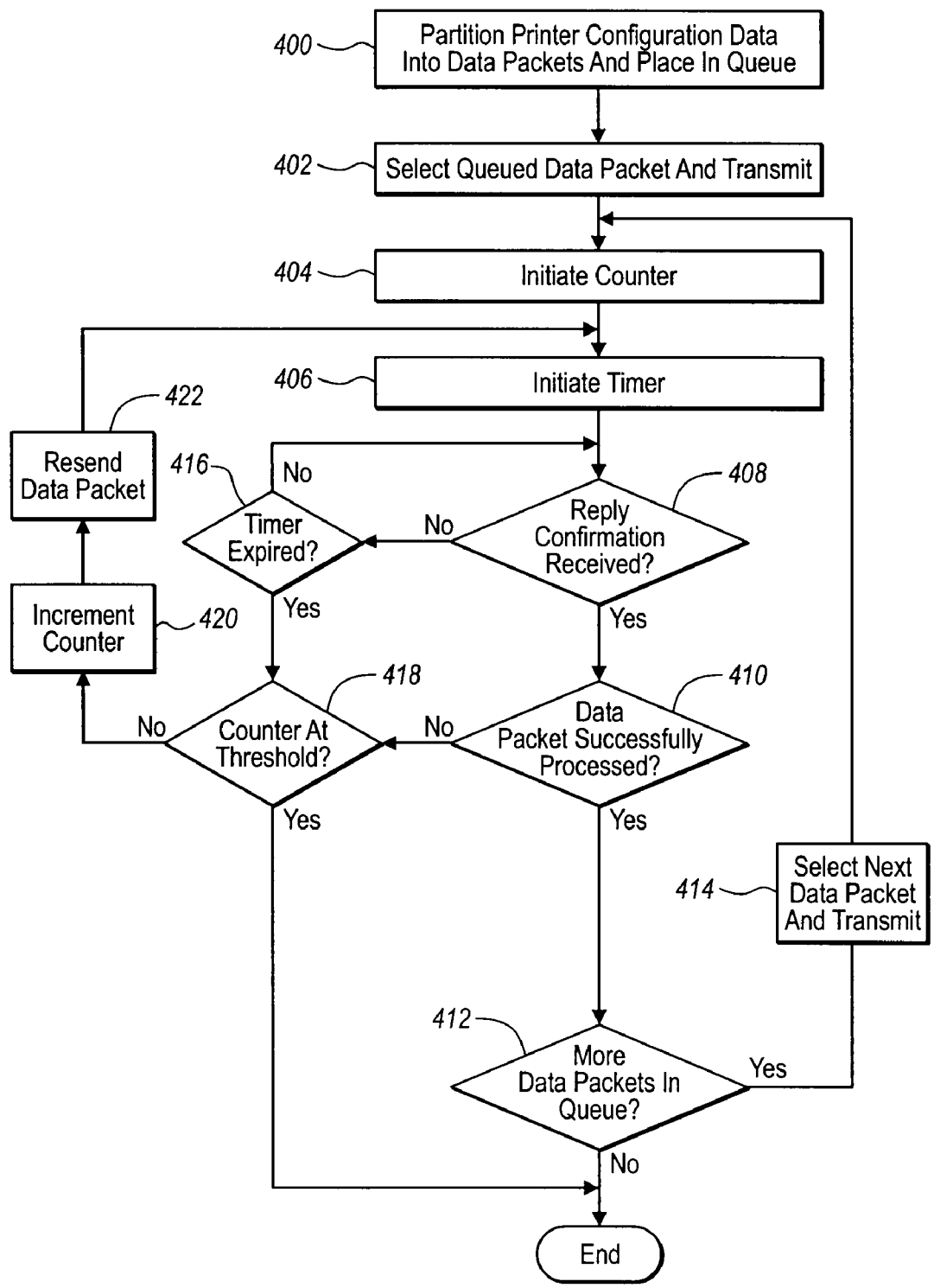

FIGS. 6a and 6b illustrate example methods for performing bidirectional data packet communication between the wireless printers 22 and 30. For example, when the existing networked wireless printer 22 sends printer configuration data to the new wireless printer 30, the wireless printer 22, at step 400 of FIG. 6a, partitions the printer configuration data into data packets and places the data packets in a queue. At step 402, the wireless printer 22 retrieves the first packet in the queue and transmits the retrieved data packet to the new wireless printer 30. At step 404, a counter is initiated, and at step 406, a timer is initiated. At step 408, the wireless printer 22 awaits receipt of a reply data packet from the new wireless printer 30 confirming receipt of the transmitted data packet.

If the reply data packet is received before the timer expires, the wireless printer 22, at step 410, checks the return code bytes 304 of the reply data packet to determine if the data packet was successfully processed by the new wireless printer 30. If the data packet was successfully processed, the wireless printer 22 checks to see if more data packets exist in the queue, at 412. If not, the wireless printer 22 restores its settings and resets itself, as described in FIG. 3, at 110. If however, data packets exist in the queue, the wireless printer 22, at step 414, selects and transmits the next data packet in the queue and reinitiates the counter, at 404.

At step 408, if the reply confirmation has not been received, and if the timer expires (416) before a reply data packet is received from the new wireless printer 30, the counter value is checked, at 418, to determine if it has reached a threshold level. If the counter has not reached the threshold level, the counter is incremented at step 420 and the wireless printer 22 resends the data packet, at 422, before reinitializing the timer, at 406. At 418, if the counter threshold level is reached, the new wireless printer 30 is deemed to be offline and the wireless printer 22 restores its settings and resets itself, as described in FIG. 3, at 110.

Referring now to FIG. 6b, when the new wireless printer 30 receives a data packet from the wireless printer 22, in the illustrated example the new wireless printer 30 can be implemented to perform error checking to ensure correct receipt of the data packet, as is denoted at 500. While other error correction schemes could be used, in the illustrated example the new wireless printer 30 verifies the checksum bytes 304 of the data packet with a checksum calculated using the message bytes 308 of the data packet. If the checksum is verified at step 502, the new wireless printer 30 processes the message bytes 308 of the data packet, at 504. A reply data packet confirming safe receipt of the data packet is then transmitted to the wireless device 22, as is denoted at step 506. The reply data packet identifies whether the message bytes 308 were successfully processed by the new wireless printer 30. For example, in one embodiment, the return code bytes 304 are set to 0x000 if the message bytes 308 were successfully processed and 0xFFFF if not. If the checksum is not verified at 502, no reply data packet is returned to the wireless printer 22, prompting the wireless printer 22 to resend the data packet unless the timer has expired and/or the counter has reached the threshold level.

If the new wireless printer 30 needs to send data back to the wireless printer 22, the data can be included in the message byte section of the reply data packet. If no data is being sent by the new wireless printer 30, the message byte section of reply data bytes is empty.

The above described embodiment shows automated configuration of wireless printers in a network environment using wireless communication between the wireless printers. This wireless communication can be provided by way of a number of schemes, including, but not limited to infrared, Bluetooth and Ad-hoc IEEE 802.11x connections. Those of skill in the art will appreciate that if desired, the source and target wireless printers can communicate printer configuration data over a wired link such as for example via a serial RS232 cable, a parallel RS422 cable, an RS485 universal serial bus or other suitable wired connection. Moreover, it will be appreciated that the above automated configuration procedure is not limited to wireless printer configuration. Those of skill in the art will appreciate that the automated procedure can be applied to other types of wireless peripheral devices that require some level of configuration so as to operate within a desired communication scheme such as a network.

The above description is provided in the context of using an existing "source" device to automatically configure a new peripheral "target" device. It will be appreciated that the approach may not be entirely satisfactory when a large number of peripheral devices must be configured for network operation. In this situation, an alternative embodiment might be utilized, which provides a system and method for automatically configuring a plurality of wireless peripheral devices in an efficient manner.

In this alternative embodiment, there exists at least one, and likely a number of peripheral devices that require configuration for operable connection to the network. In this embodiment, a "master" device is used to identify at least one of the peripheral devices that requires network configuration, and to then wirelessly communicate the configuration dataset/database (in whole or in part) to that target device. The target peripheral device then configures itself by applying the appropriate configuration information, as previously described. Thus, in this embodiment a master device functions in much the same way as the "source" device previously described in that the device is capable of passing configuration data to a "target" device so as to permit its configuration within the network. However, in this alternative embodiment, the device does not need to be manipulated by a user to assume master (source) status; instead, a device assumes master functionality at the behest of another master device as a result, for example, of receipt of a "master" start command.

In preferred embodiments, in addition to passing the configuration database, a master device "replicates" itself by passing appropriate master "settings" information (data that is relevant to master device functionality, as will described further below) to the newly configured peripheral device, and requesting that the newly configured device assume the functionality of a master device by issuing a master start command or message. The newly created master device identifies at least one of the remaining peripheral devices within the network environment that has yet to be configured (based, for example, on the settings information received from the previous master). The new master device then wirelessly transmits the configuration dataset to the identified wireless peripheral device. Upon receiving the configuration datasets, the target wireless peripheral device automatically applies the configuration dataset, which again enables the peripheral device to assume network operation. Master functionality is again replicated to the new device, and the device assumes the role of "master," receiving master settings information from the previous master. In the event that additional wireless peripheral devices exist within the network environment that have yet to be configured, the new master device forwards the configuration dataset to at least one of the remaining wireless peripheral devices. This replication process is repeated until all peripheral devices within the network environment have been properly configured. This process of replicating master devices greatly decreases the network configuration time and greatly simplifies the network configuration process, especially where there is a large number of peripheral devices that need to be added to the network. Moreover, it eliminates the need for a user to physically manipulate a peripheral device to place it in a "source" or a "target" mode in order to configure devices.

Figure 7:
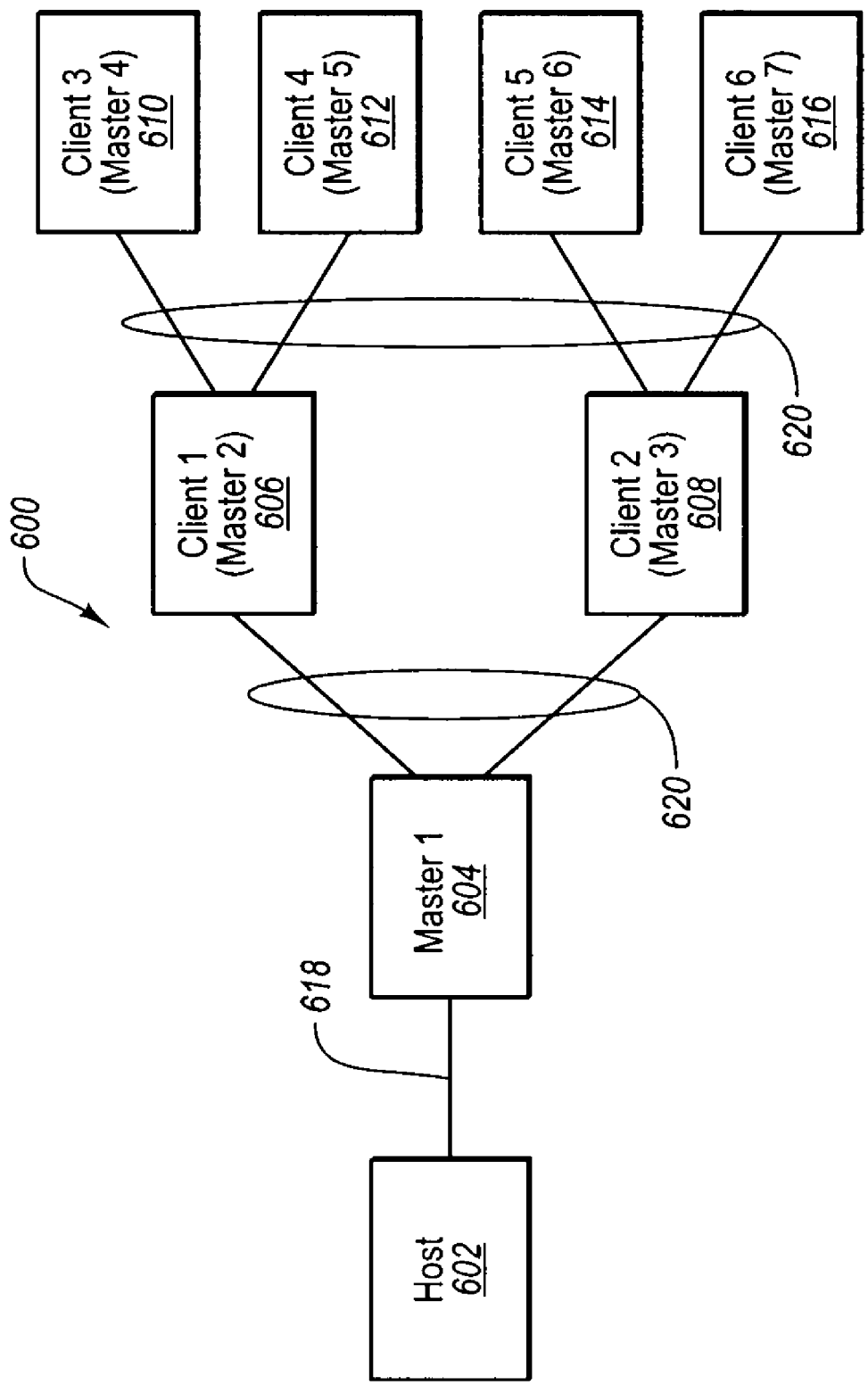
FIG. 7 is a schematic diagram of an example network environment including a host device and a plurality of wireless referral devices.

Turning now to FIG. 7, one example of a network environment having multiple peripheral devices needing configuration is illustrated and is generally identified by reference numeral 600. The illustrated example network environment 600 includes a host system 602 and at least one wireless peripheral device 604 which is capable of being designated as a master device at the request of host 602. The link 618 between the host system 602 and the peripheral wireless device 604 may be a wired or a wireless connection. The host system 602 may comprise a server, a personal computer, or any other computer device capable of communicating with the peripheral device 604.

A plurality of additional wireless peripheral devices 606, 608, 610, 612, 614 and 616 are also shown within the network environment 600. Each of these devices is able to wirelessly communicate with device 604, but require some level of configuration so as to be capable of functioning within the network environment.

In the illustrated embodiment, the plurality of wireless devices 604-616 communicate with one another using one or more wireless communication channels 620. In one embodiment, a wireless network access point (not shown) is provided for granting access to a WAN or other network. While other wireless connection schemes can be used, in the illustrated embodiment the wireless devices 604-616 communicate with the wireless network access point using IEEE 802.11x technology. The wireless devices 604-616 can be any type of peripheral device, including a personal digital assistant ("PDA"), a laptop or personal computer, a printer, a cellular telephone, and the like. Although the network environment 600 is shown as including seven wireless devices 604-616, those of skill in the art will appreciate that this is for ease of illustration only. The network environment 600 may include virtually any number of wireless peripheral devices.

After receiving the configuration database from the host 602, the master device 604 receives a command from the host 602 to initiate the configuration of the other wireless peripheral devices 606-616 within the network environment 600. For example, the master settings information may include a list of all peripheral "target" devices that require network configuration. The master device 604 scans for and finds a target client requiring configuration, such as client 606. Upon finding the client 606, the master device 604 wirelessly transmits the configuration database (in whole or in part depending on the needs of the device) to the client device 606. As previously discussed, the configuration dataset includes data for allowing the client 606 to assume network operation, i.e., to communicate with other devices via the network infrastructure provided by environment 600. The configuration information may also include other data, such as security information, user preferences, setup constructions, and the like, as previously discussed.

In addition to passing the configuration dataset, device 604 also passes master settings information (including, for example, a list of other target devices requiring network configuration) and requests that the client device (Master 2) 606 assume master functionality by issuing a master "start" command. Device 606 is then capable of configuring other wireless peripheral devices, e.g., clients 610 and 612. The process repeats itself, and the wireless device 606 wirelessly transmits the configuration database to the target clients 610 and 612, as well as any pertinent master settings information, to configure the clients to assume network operation and to then assume the role of a master device. Similarly, in some embodiments the original master device 604 may configure other wireless peripheral devices, e.g., client 608, which in turn can configure additional wireless peripheral devices, e.g., clients 614 and 616. This process continues to repeat itself until all wireless peripheral devices within the network environment 600 have received the configuration database and have been appropriately configured and have joined the network environment 600. In preferred embodiments, the host device 602 can be notified of the fact that configuration of peripheral devices has been completed.

Figure 8:
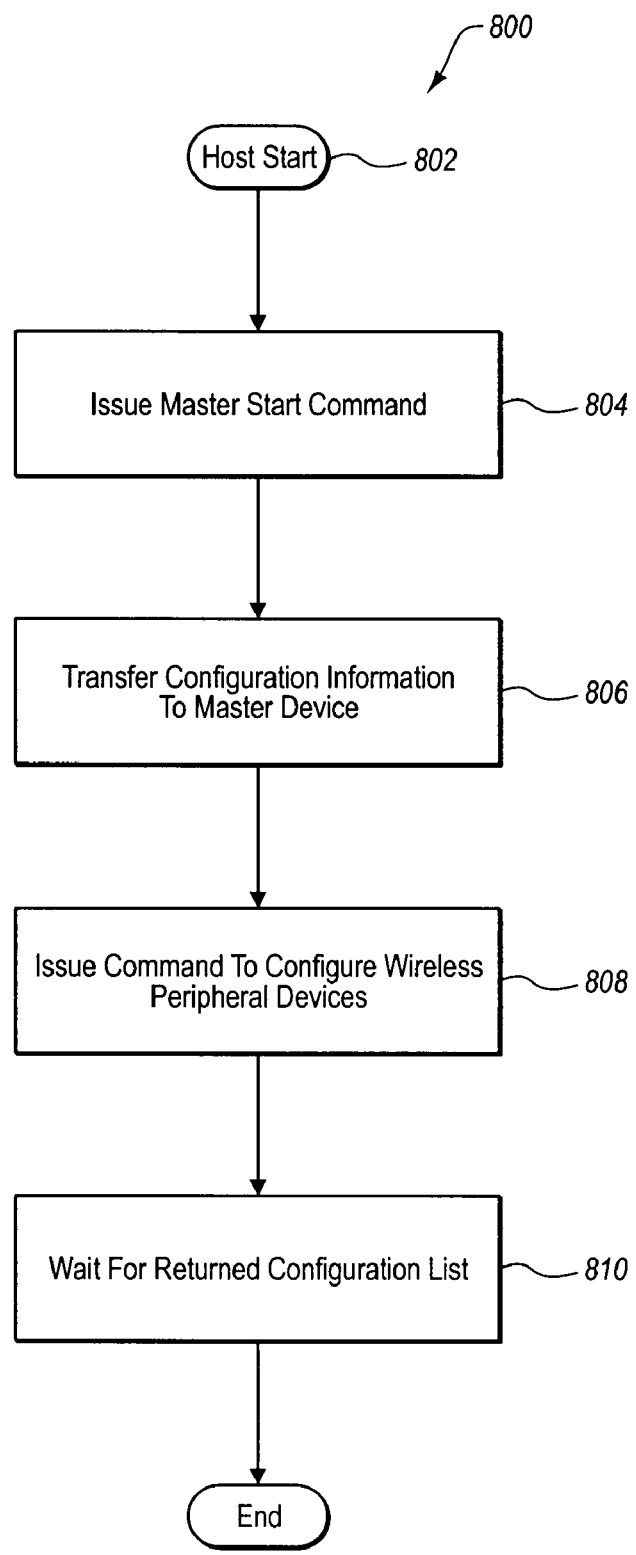
FIG. 8 is a flowchart of one example of a method performed by a host device for configuring a master device.

FIG. 8 illustrates one embodiment of an aspect of a method 800 that can be used for automatically configuring a plurality of wireless peripheral devices, shown generally from the perspective of a programmable host device, such as host 602 in FIG. 7. The host device 602 may include one or more computer-readable media having computer-executable instructions, that when executed, implement the example method denoted at 700. Upon start of the process, the host 602 includes the identity of a plurality of wireless peripheral devices that require network configuration (e.g., peripheral devices 606-616). Such information—a list of all peripheral "target" devices that require network configuration—might be included as part of the master settings information.

The method 800 includes, at program step 804, issuing a master start command to an existing peripheral device, for example device 604 of FIG. 7. As noted, the master start command essentially requests the receiving device to assume the role of a master device (i.e., a device that in turn initiates the automatic network configuration of a target peripheral device). This step would also typically include passing any pertinent master "settings" information, which might include, for example, a listing of all peripheral devices that require network configuration and any other relevant information needed by a master device.

At program step 806, the host 602 transfers the configuration database information to the master device 604. Again, the configuration database will include any relevant configuration information/data required for configuration of the peripheral devices that are to be configured, as previously discussed.

Upon passing the configuration database to the "new" master device 604, the host device 602 issues a command to initiate configuration of the identified peripheral devices, as is denoted at step 808. In one embodiment, the command to configure the remaining wireless peripheral devices may include the total number of wireless peripheral devices within the network environment 600 that need to be configured. For example, and referring again to FIG. 7, the host device 602 may issue a command to the master device 604 to configure six additional wireless peripheral devices 606-616.

In the illustrated embodiment, the method 800 also includes, at step 810, waiting for one of the wireless peripheral devices to return a list of the wireless peripheral devices that have been configured in order to determine if the command issued at 808 was completed successfully.

Figure 9:
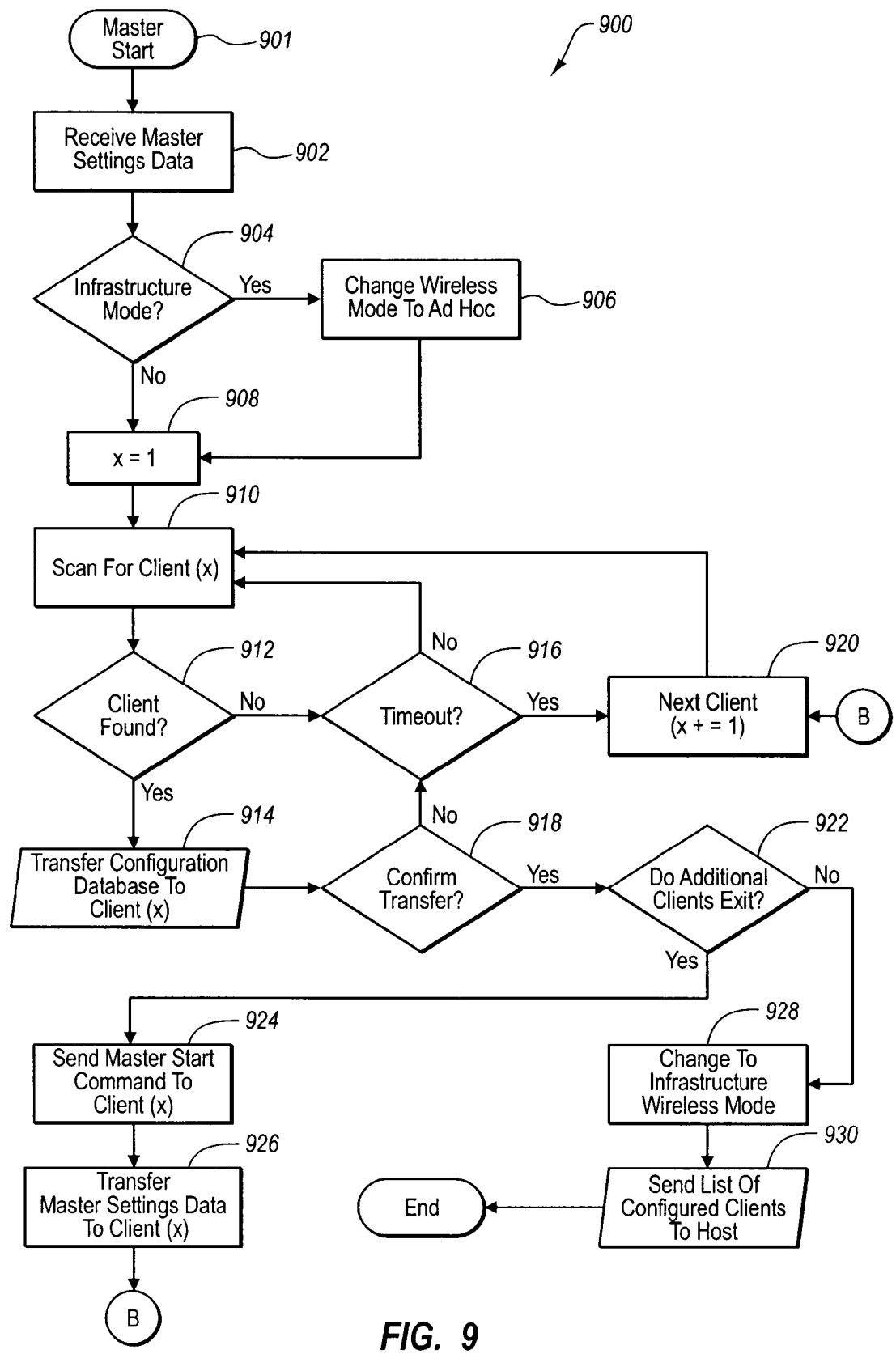
FIG. 9 is a flowchart of one example of a method performed by a master device for configuring one or more peripheral devices.

Referring now to FIG. 9, another example method, denoted at 900, is illustrated. Generally, this method shows an example of the program steps that can be used for allowing a master device to configure a plurality of wireless peripheral devices such that the wireless peripheral devices may assume network operation and then also assume the role of a master device. The method 900 may be practiced, for example, in a peripheral device, such as the device 604 of FIG. 7, or any other device that subsequently assumes master functionality. The peripheral device may include one or more computer-readable media having computer-executable instructions, that when executed, implement the method 900.

In the illustrated example, the method 900 begins at "master start" step 901. In one embodiment, "master start" 901 is initiated upon receiving a master start command from a host system (e.g., at 804 of method 800 in FIG. 8) or from a wireless peripheral device that has already been configured to operate as a master device (e.g. device 604 in FIG. 7), and including any master settings data relevant to the master device operation. The method 900 also includes, at step 902, receiving the configuration dataset/database. Again, the configuration data may be received from a host device 602 via either a wired or a wireless connection, or may be received from another wireless device that has been configured to act as a master device. In one embodiment, the master settings data might include the number of wireless peripheral devices that this particular master device will configure (denoted as x).

At program step 904, the method 900 determines if the network environment is operating in an infrastructure mode or an ad hoc mode. If the network environment is operating in an infrastructure mode, the wireless mode is changed to an ad hoc mode, at 906. Infrastructure mode typically requires wireless devices to communicate through use of one or more wireless access points. Conversely, ad-hoc mode typically allows wireless devices to communicate directly with one another, without necessitating a wireless access point. Of course, this may change if a different wireless environment/protocol is in use.

At 908, the method 900 initializes a counter that may be used for tracking the number of wireless peripheral devices that the current master device has configured. The method 900 further includes, at step 910, scanning for a wireless peripheral device to be configured. If, at 912, the wireless peripheral device has not been found, a check is performed, at 916, to determine if a timeout condition has been met. If a predetermined amount of time has not expired, the method 900 continues to scan for the wireless peripheral device, at 910, until the timeout occurs. When the timeout occurs, the counter is increased, at 920, such that the master device will begin scanning for the next wireless peripheral device that is in need of configuration.

Upon finding the appropriate target client, at step 912, the master device wirelessly transfers the configuration database to the wireless peripheral device, at 914. If it is determined at step 918 that the transfer was unsuccessful (as discussed above), the process is repeated, and the database is transferred to the wireless peripheral device again. If the configuration database information was transferred successfully, the master device determines at step 922 whether additional wireless peripheral devices exist within the network environment that still require configuration. If additional wireless peripheral devices do exist, the master device sends a master start command to the just configured wireless peripheral device at step 924 to "replicate" master functionality to the new device. Then, at step 926 the master device transfers the master "settings" data to the wireless peripheral device. From that point, the wireless peripheral device can also continue the process of configuring other wireless peripheral devices that are still in need of configuration. At step 920, the master device increments the counter and begins scanning for the next wireless peripheral device, as is shown at step 910.

If the master device determines at step 922 that no additional clients exist, the master device changes the wireless mode back to infrastructure mode at step 928. The method includes, at 930, sending the list of configured clients back to the host device. This permits the host device 602 to determine whether all peripheral devices have been configured.

Figure 10:
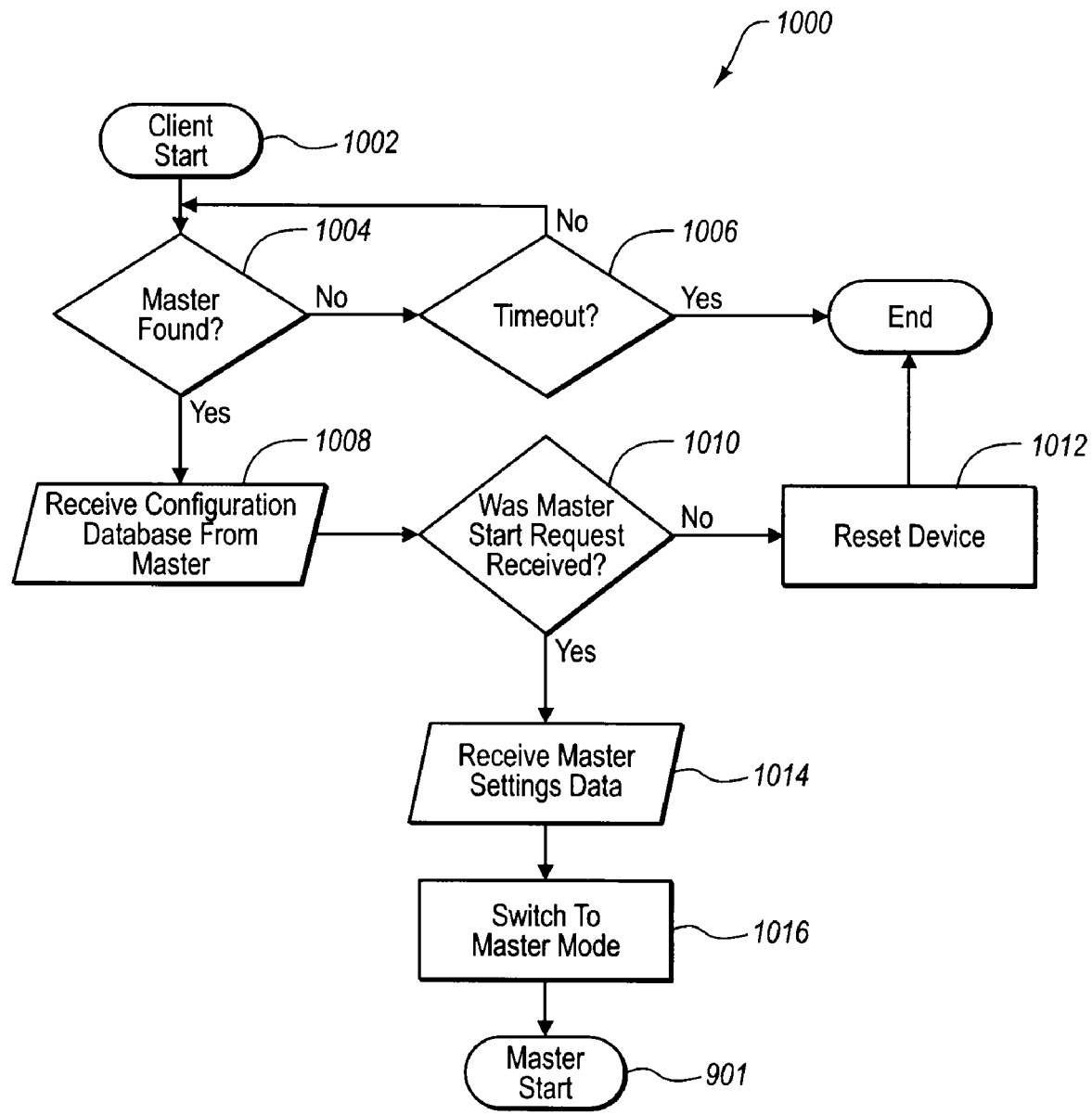
FIG. 10 is a flowchart of one example of a method for configuring a wireless peripheral device.

Referring now to FIG. 10, one example of a method for receiving configuration data and master settings data from a master wireless device at a target peripheral device is shown. The method, denoted generally at 1000, may be practiced, for example, in a wireless peripheral device, such as any of the devices 606-616 of FIG. 7. The wireless peripheral device may include one or more computer-readable media having computer-executable instructions, that when executed, implement the steps of method 1000. The method 1000 includes, at steps 1004 and 1006, waiting to be placed in communication with a master device. During this process, a master device may search for the wireless peripheral and initiate communication as discussed previously. If a master device has not been found (i.e., does not initiate communication) within a timeout period, the process is terminated.

Once a master is found (initiates communication), the method 1000 further includes, at 1008, receiving the configuration database from the master device via a wireless transmission. After receiving the configuration database (and initiating network configuration, as previously described) the master device may send the newly configured wireless peripheral device a master start request. At step 1010, if the master start request was not received, step 1012 is performed to reset the device prior to terminating the process. If the master start request was received, processing continues at step 1014 and master settings data is received from the master device via a wireless transmission.

Upon receiving the master settings data, the wireless peripheral device switches to master mode, as is denoted at step 1016, and the device begins functioning as a master device, as is denoted at step 901. Referring again to FIG. 9, upon initiating the functionality of a master device, the wireless peripheral device proceeds to configure the other wireless peripheral devices within the network environment and in accordance with the master settings data. Because the wireless device already received the master settings data at 1014, the device may skip step 902 if necessary.

As can be seen from the above, the alternative embodiment allows automatic configuration of devices within a network, and does so in a manner that largely eliminates user intervention. The process and system is ideally suited to the situation where a large number of devices require configuration. By replicating the master device functionality, and sharing the burden of configuring the remaining wireless devices, the process of configuring all of the wireless devices within a network is facilitated, because an administrator merely needs to initiate the configuration of the first master device 604. The configuration of the remaining devices 606-616 is then performed automatically. Furthermore, by replicating the master devices, the overall time that is required to configure the entire network is reduced.

Embodiments herein may include a special purpose or general-purpose computer including various computer hardware schemes. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of automated wireless peripheral device configuration in a network environment, the method comprising:
    conditioning an existing networked device to transmit configuration data to a new peripheral device that is to be added to the network environment;
    automatically applying the configuration data to the new peripheral device to enable the new peripheral device to assume network operation;
    requesting, by the existing networked device, that the new peripheral device transmit at least a portion of the configuration data to a second peripheral device that is to be added to the network environment; and
    automatically applying the transmitted configuration data to the second peripheral device to enable the second peripheral device to assume network operation.

2. The method as recited in claim 1, wherein the conditioning comprises operating the transmitting device as a master device in response to the receipt of a host start signal.

3. The method as recited in claim 1, further comprising: forwarding the configuration data from a host device that is operably connected to the existing networked device.

4. The method as recited in claim 1, wherein the conditioning occurs as a result of a signal received by the existing networked device from a host device.

5. The method as recited in claim 1, wherein the configuration data is transmitted over a wireless communication link.

6. The method as recited in claim 1, wherein at least one of the new peripheral device and the second peripheral device comprise a printer.

7. The method as recited in claim 1, wherein the configuration data includes one or more of the following: service set identifier ("SSID") information; wireless network access point identification information; security setting information; network mode information; network transmission rate; power management information; access point density; simple network management protocol ("SNMP") settings; and line printer requester ("LPR") settings.

8. In a network environment, a method of automatically configuring a plurality of wireless peripheral devices, the method comprising:
    identifying the plurality of wireless peripheral devices;
    transferring a configuration database to an existing networked wireless device and conditioning the existing networked wireless device to function as a master device;
    identifying one of the remaining wireless peripheral devices;
    replicating the master device by wirelessly transmitting at least a portion of the configuration database from the master device to the identified wireless peripheral device, the configuration data enabling the identified peripheral wireless device to assume network operation and to assume functionality of the master device; and
    repeating the identifying and the replicating steps.

9. The method as recited in claim 8, wherein the configuration database is transferred to the exiting networked wireless device via a wired connection.

10. The method as recited in claim 8, wherein the repeating occurs until all of the plurality of wireless peripheral devices have received the configuration data, thereby enabling each of the plurality of wireless peripheral devices to assume network operation.

11. The method as recited in claim 8, wherein the replicating step includes:
    wirelessly transmitting a master start command from the master device to the identified wireless peripheral device for instructing the identified wireless peripheral device to assume master functionality of the wireless master device.

12. The method as recited in claim 8, further comprising:
    utilizing an ad hoc wireless mode while replicating the master device.

13. The method as recited in claim 12, further comprising:
    changing to an infrastructure wireless mode after replicating the master device.

14. In a network environment, a method of automatically configuring a plurality of wireless peripheral devices, the method comprising:
    configuring a new peripheral device at the request of a network connected master device, the configuration including automatically applying configuration data to the new peripheral device to enable the new peripheral device to assume network operation;
    conditioning the new configured peripheral device to function as the master device; and
    repeating the configuring and conditioning steps until a predetermined number of additional new peripheral devices have assumed network operation.

* * * * *